United States Patent Office 3,381,021
Patented Apr. 30, 1968

3,381,021
METHOD FOR THE PREPARATION OF α,δ-DI-KETONES FROM α,β-ETHYLENICALLY UNSATURATED MONOKETONES
Sudarshan K. Malhotra, Northboro, Mass., and Juraj J. Hostynek, Midland, Mich., assignors to The Dow Chemical Company, Midland, Mich., a corporation of Delaware
No Drawing. Filed June 2, 1967, Ser. No. 643,060
8 Claims. (Cl. 260—397.2)

ABSTRACT OF THE DISCLOSURE

α,β-Ethylenically unsaturated monoketones are converted into the corresponding Schiff base. The Schiff base, after rearrangement, is oxidized with molecular oxygen and the resulting oxidation product hydrolyzed, thus yielding the corresponding α,δ-diketones.

This invention relates to a method for the preparation of α,δ-diketones from α,β-ethylenically unsaturated monoketones.

In the copending application Ser. No. 610,792 is described a method for the selective reduction of the α,β-ethylenical double bond in polyunsaturated carbonyl compounds by converting the carbonyl compound with a primary amine into a Schiff base, followed by isolation and rearrangement of the Schiff base and subsequent hydrolysis. In this manner only the ethylenic double bond which stands in conjunction with the carbonyl group is reduced.

It has now been found that it is possible to introduce an additional keto group at the other side of the ethylenic double bond while maintaining said ethylenic double bond, thus obtaining α,δ-ethylenically unsaturated diketones.

Thus the present invention provides a method for the preparation of α,δ-ethylenically unsaturated diketones from α,β-ethylenically unsaturated monoketones by converting the latter with a primary amine into a Schiff base, reacting the Schiff base with molecular oxygen, thus providing the corresponding keto-derivative of the Schiff base, followed by hydrolysis which results in the corresponding α,δ-ethylenically unsaturated diketone being obtained.

As molecular oxygen can be used any gaseous composition comprising $O_2$, air being the preferred source for molecular oxygen.

Suitable primary amines are benzylamine and ring substituted benzylamines, such as, for example, p-nitrobenzylamine and diphenylmethyl amine.

The reaction scheme is assumed to be as follows (based on benzylamine)

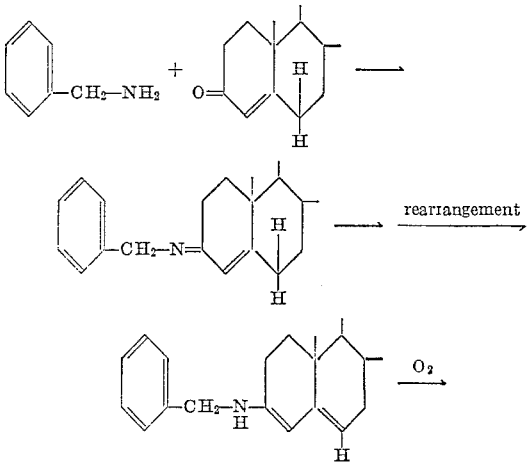

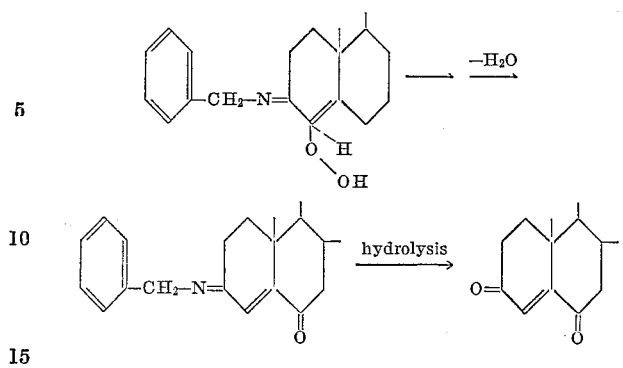

In order to promote the oxidation by molecular oxygen it is advantageous to have a catalytic amount of an acid catalyst such as for example, p-toluene sulfonic acid present. The oxidation is carried out in a solvent solution, for which any solvent, which is inert to and dissolves the reactants, can be used. Preferred solvetns are those that form an azeotrope with water, such as for example benzene and toluene.

Suitable, α,β-ethylenically unsaturated monoketones as starting materials are for example testosterone, cholest-$\Delta^4$-en-3-one, ergosterone and cholesta-$\Delta^{4,7}$-dien-3-one.

The preferred temperature for carrying out the sequence of reactions ranges from 0° C. to 150° C. At lower temperatures the reaction will be too slow to be economically attractive, whereas above 150° C. not only decomposition may occur, but also it is difficult to find solvents which will form an azeotrope with water.

Suitable solvents for preparing the Shiff base are for example benzene, dimethylsulfoxide, the dimethyl ether of ethylene glycol (usually referred to as "glyme") and the dimethyl ether of diethylene glycol.

In the reaction to prepare the Shiff base it is preferred to use about 1.3 moles of amine per mole of the keto compound. Less than 1 mole of amine results in an incomplete reaction while more than 3 moles has a tendency to given addition across double bonds instead of reaction solely at the keto group.

In the next stage of the reaction, the rearrangement of the Schiff base, an acid or base catalyst is used in an amount of from 0.001 to 1 mole per mole of Schiff base. More than 1 mole starts to have a deleterious effect to the yield of the reaction. A suitable catalyst is for example potassium-t-butoxide, an alkaline catalyst, but acidic catalysts such as for example diluted organic or inorganic acids can also be used as catalyst.

The following examples are illustrative for the present invention.

Example I

OXIDATION OF TESTOSTERONE TO 6-KETO-TESTOSTERONE VIA BENZYLAMINE SCHIFF BASE

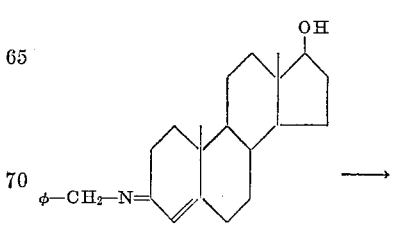

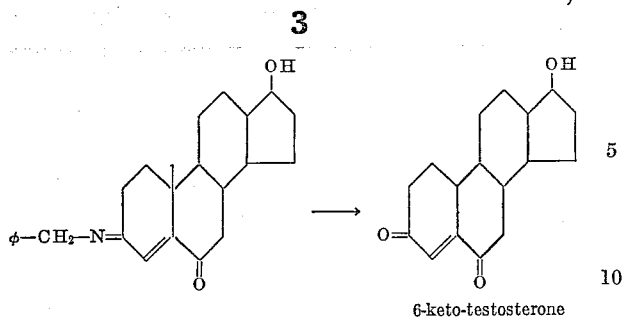

6-keto-testosterone

φ=phenyl

Through a solution of 270 mg. (0.72 mmole) of benzylamine Schiff base of testosterone and 5 mg. of p-toluenesulfonic acid in 250 ml. of benzene containing 2.5 g. of activated molecular sieves, air was passed by a gas dispersion tube for 24 hours. at room temperature. To avoid the cooling of the reaction mixture by evaporation the reaction vessel was kept in a large water bath. The solvent was added as was found necessary to compensate for the loss due to evaporation. The reaction mixture was filtered and the sieves were washed with ethylacetate. The combined filtrate was concentrated to 100 ml. volume and treated at 100° with 2 ml. of 50% acetic acid. The resulting solution after cooling was washed with sodium bicarbonate solution and with water. It was dried over anhydrous magnesium sulfate and concentrated under vacuo to give 255 mg. of a viscous oil, which on column chromatography with silica gel (150 g.) furnished 65 mg. (31%) of unreacted testosterone and 135 mg. (62%) of 6-keto-testosterone, M.P. 213–215° (crystallized from ethanol). The product showed absorption band at 1685 cm.$^{-1}$ (CH$_2$Cl$_2$ solution) in the infrared and a maximum at 252 mμ in the ultraviolet.

OXIDATIVE REDUCTION OF TESTOSTERONE TO 6-KETO - 5 - DIHYDROTESTOSTERONE VIA BENZYLAMINE SCHIFF BASE

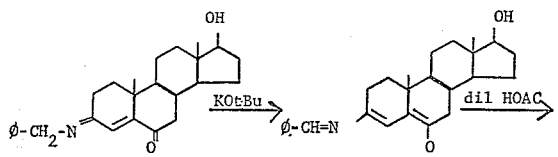

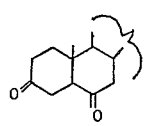

A solution of 1.32 g. (3.5 mmoles) of the benzylamine Schiff base of testosterone was subjected to air oxidation as described before and the resulting solution was heated at reflux with 38 mg. of potassium t-butoxide (anhydrous) for 5 hr. under nitrogen. After the hydrolysis with dil acetic acid as described in the previous experiment 1.23 g. of a dark brown oil, which crystallized on standing, was obtained. Column chromatograph of 350 mg. of this product on 250 mg. of silica gel gave 22 mg. (8%) of androstanolone or 5α-dihydrotestosterone, 34 mg. (12%) of starting material, i.e., testosterone, 30 mg. (10%) of 6-keto-testosterone and 165 mg. (60%) of 6-keto - 5α - dihydrotestosterone, M.P. 226–228°, which showed an absorption band at 1710 cm.$^{-1}$ in its infrared spectrum.

Example II
OXIDATION OF CHOLESTENONE TO 6-KETO-CHOLESTENONE VIA BENZYLAMINE SCHIFF BASE

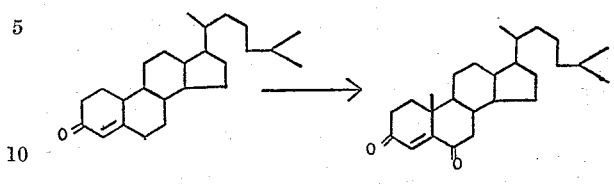

A benzene solution of 238 mg. (0.5 mmole) of cholest-Δ$^4$-en-3-one was air oxidized by the previously described procedure. The usual hydrolysis with dil·acetic acid and work-up of the reaction mixture led to 203 mg. of a viscous oil, which crystallized on standing. Chromatography of the product on silica gel and elution with a 9:1 mixture of chloroform and ethyl acetate gave 153 mg. (77%) of pure cholest-Δ$^4$-en-3-6-dione, M.P. 123–124 (crystallized from EtOH), which showed no depression in mixed melting point with the authentic material. It exhibited a strong absorption band in the I.R. spectrum at 1685 cm.$^{-1}$ (CH$_2$Cl$_2$ solution) and a EtOH max. at 252 mμ in the U.V. spectrum.

OXIDATIVE REDUCTION OF CHOLESTENONE TO CHOLESTANE-3,6-DIONE VIA BENZYLAMINE SCIFF BASE

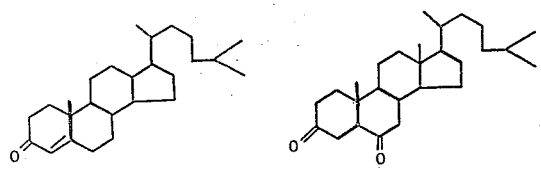

Benzylamine Schiff base of cholest-Δ$^4$-en-3-one 150 mg., (0.32 mmole) was oxidized by the usual procedure. Benzene was removed under reduced pressure and was replaced with 25 ml. of dry diglyme. The resulting solution was treated with 33 mg. (1 eq.) of anhydrous potassium t-butoxide at reflux for 1 hr. After the usual hydrolysis and work-up the product was subjected to column chromatography on silica gel (elution with 19:1 mixture of chloroformethyl acetate), which led to 29 mg. (24%) of starting cholestenone and 82 mg. (64%) of 6-keto-cholestan-3-one, which was shown to be identical with the authentic material by the mixed melting point.

Example III
OXIDATION OF ERGOSTERONE TO 6-KETO-ERGOSTERONE VIA BENZYLAMINE SCHIFF BASE

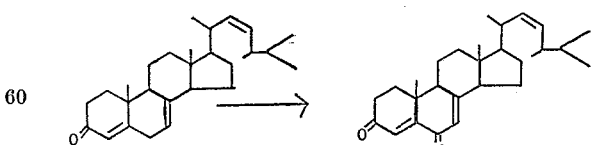

Schiff base of ergosterone (242 mg., 0.5 mmole) was subjected to air oxidation according to the aforementioned procedure for 1 hr. Hydrolysis of the resulting reaction mixture with dil·acetic acid and the usual work-up gave 199 mg. of a yellow crystalline material which on recrystallization from a mixture of ethanol and methanol gave 185 mg. (91%) of the pure material M.P. 176–177°. It possessed a strong absorption band at 1665 cm.$^{-1}$ and medium bands at 1690 cm.$^{-1}$ and 1600 cm.$^{-1}$. In the U.V. it exhibited EtOH max. at 278 mμ.

OXIDATIVE REDUCTION OF ERGOSTERONE TO 6-KETO-5α - DIHYDRO-DERIVATIVE VIA BENZYLAMINE SCHIFF BASE

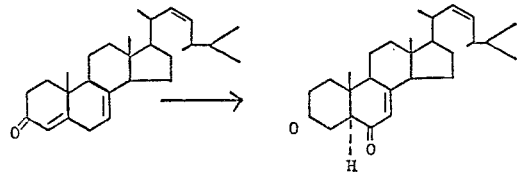

Schiff base of ergosterone (120 mg., 0.25 mmole) was air oxidized in the usual manner (as described above). Benzene was replaced by monoglyme (20 ml.) and treated with anhydrous potassium t-butoxide (11 mg.) at reflux for 30 min. Hydrolysis and the usual work-up of the resulting reaction mixture gave an orange oil. Silica gel chromatography afforded 12 mg. (12%) of $\Delta^{8(14)}$-isomer of 5α-dihydro-6-keto-ergosterone, M.P. 185–188° which showed absorption in the infrared at 1710 cm.$^{-1}$. This product was however isomerized with base to 5α-dihydro-6-keto-ergosterone.

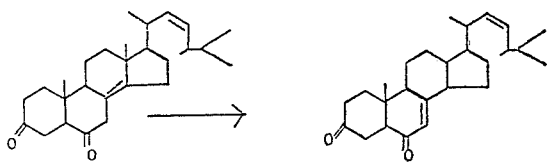

In addition to this isomer 46 mg. (45%) of the desired isomer 5α-dihydro-6-keto-ergosterone M.P. (195–197°) was obtained. This isomer showed infrared absorption band at 1665 cm.$^{-1}$ and 1710 cm.$^{-1}$ and a maximum in the U.V. spectrum at 245 m. The combined yields of the two isomers thus show that the reduction had occurred to the extent of 57%.

It was however found that when the yellow oil (obtained in a separate experiment carried out under identical conditions) was allowed to stand for a while a crystalline product separated out, which on recrystallization from benzene afforded 40 mg. (37%) of a solid M.P. 188–190°. Mass spectral analysis of this material showed a parent peak for the molecular ion at 428 and by precise mass analysis a molecular formula of $C_{28}H_{40}O_3$ could be assigned to this product. Further evidence regarding the structure came from the I.R., U.V. and N.M.R. spectra of this material and it was shown to possess the following structure

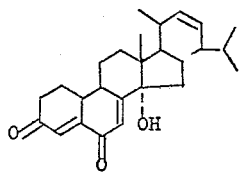

This compound is of a considerable interest since it possesses several structural features which are present in the insect hormone ecdysone.

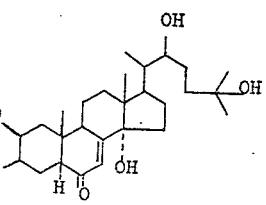

What is claimed is:
1. Method for the preparation of α,δ-diketo-steroids from α,β-ethylenically unsaturated mono-keto-steroids, characterized in that the α,β-ethylenically unsaturated monoketone is reacted in solution with a primary amine, the resulting Schiff base after rearrangement is reacted with molecular oxygen and the reaction product is subjected to hydrolysis.
2. Method according to claim 1, characterized in that the primary amine is benzylamnie.
3. Method according to claim 1, characterized in that the temperature of the reaction mixture is held between 0° and 150° C.
4. Method according to claim 1, characterized in that the solution comprises a solvent which is capable of forming an azeotrope with water.
5. Method according to claim 1, characterized in that the α,β-ethylenically unsaturated monoketone is testosterone.
6. Method according to claim 1, characterized in that the α,β-ethylenically unsaturated monoketone is cholest-Δ⁴-en-3-one.
7. Method according to claim 1, characterized in that the α,β-ethylenically unsaturated monoketone is ergosterone.
8. Method according to claim 1, characterized in that the α,β-ethylenically unsaturated monoketone is cholesta-$\Delta^{4,7}$-dien-3-one.

References Cited
UNITED STATES PATENTS
3,004,968  10/1961  Jeger _____ 260—239.55

LEWIS GOTTS, Primary Examiner.

E. G. LOVE, Assistant Examiner.